Aug. 15, 1944. J. A. MacLEAN, JR., ET AL 2,355,986
FLOOR CLIP
Filed July 20, 1942 2 Sheets-Sheet 1
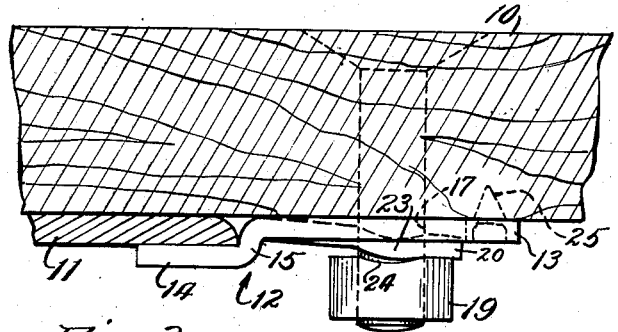
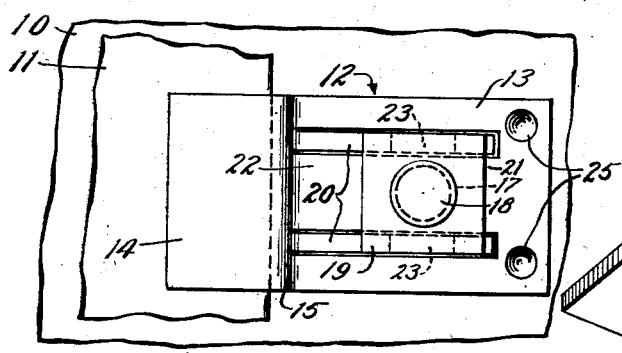
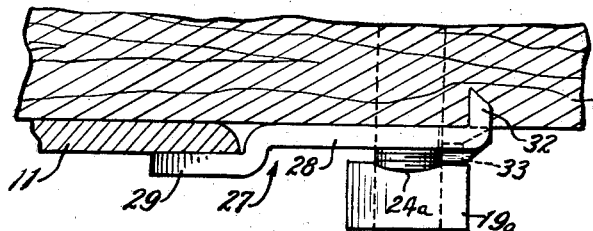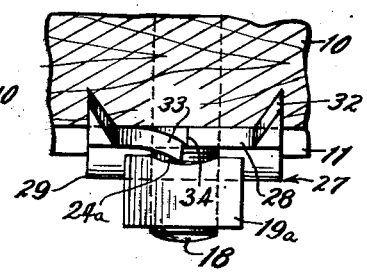
Inventors
John A. MacLean, Jr.
Norris F. McNaught, &
Ernest G. Doke.
By:
McCaleb, Wendt &
Dickinson Attys.

Aug. 15, 1944. J. A. MacLEAN, JR., ET AL 2,355,986
FLOOR CLIP
Filed July 20, 1942 2 Sheets-Sheet 2

Inventors
John A. MacLean Jr.,
Norris F. McNaught &
Ernest J. Ocke
By:—
McCaleb, Wendt & Dickinson
Attys.

Patented Aug. 15, 1944

2,355,986

UNITED STATES PATENT OFFICE 2,355,986

FLOOR CLIP

John A. MacLean, Jr., Winnetka, Norris F. McNaught, River Forest, and Ernest G. Doke, Evanston, Ill., assignors to MacLean-Fogg Lock Nut Company, Chicago, Ill., a corporation of Illinois Application July 20, 1942, Serial No. 451,668

6 Claims. (Cl. 189—35)

This invention relates to improvements in floor clips and more particularly to such clips which are adapted for relatively heavy duty use as in the construction of railway car floors.

One of the principal objects of our invention is to provide a novel one-piece floor clip unit which eliminates the need for using separate lock washers or the like for maintaining slack-takeup tension between the nut of the fastening bolt and the body of the clip.

Another object of the invention is to provide a one-piece floor clip unit which has integral therewith relatively movable means to place the clip automatically under slack-takeup tension when the nut of a fastening bolt is tightened against the clip.

Another object is to provide a floor clip of one-piece unitary construction which is not only self-tensioning but also acts automatically during installation to lock the nut of the fastening bolt positively against unintentionally turning loose.

A further object of the invention is to provide a floor clip with integral, resilient slack-takeup and nut-locking means.

Still another object of the invention is to provide a floor clip with a novel arrangement of positive nut locking means to act on the thrust face of the nut of the fastening bolt.

The foregoing, together with further objects, features and advantages of our invention, are set forth in the following description of specific embodiments thereof and illustrated in the accompanying drawings, wherein:

Fig. 1 is a fragmentary vertical sectional view through a railway car floor structure showing in side elevation a clip embodying the features of our invention;

Fig. 2 is a transverse vertical sectional view showing the clip in end elevation, and partly broken away and in section to show details of structure;

Fig. 3 is a bottom plan view of the clip and associated floor structure;

Fig. 4 is a bottom perspective view of the floor clip;

Fig. 5 is a fragmentary vertical sectional view showing a modified form of the floor clip in side elevation;

Fig. 6 is a transverse vertical sectional view showing the modified clip of Fig. 5 in end elevation;

Fig. 7 is a bottom plan view of the clip of Fig. 5;

Figure 8:
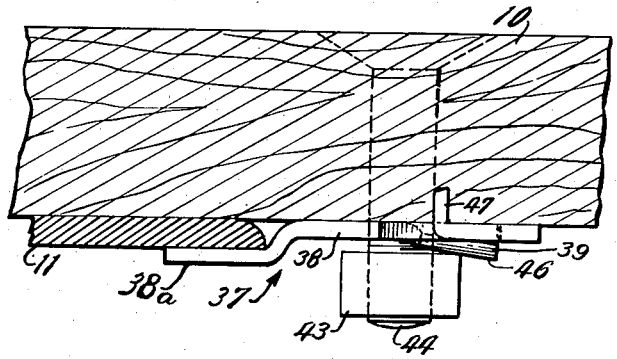
Fig. 8 is a fragmentary vertical sectional view through a railway car floor construction, showing a further modified form of our clip in side elevation.

Our floor clip is preferably adapted for use in a railway car floor wherein a floor board 10 is supported by the metal underframe of a railway car, including a supporting sill 11. As shown in Figs. 1 to 4, inclusive, a clip 12 embodying features of our invention is adapted for securing the floor board 10 to the sill 11 and comprises an elongated rectangular metal body preferably cut from flat metal stock such as sheet steel strips. The clip 12 has a board-engaging portion 13 and a sill-engaging portion 14 offset by a transverse bend 15 to an extent corresponding to the offset relationship between the clip-engaged lower faces of the floor board and the sill.

The clip portions 13 and 14 are of such respective lengths and widths as have been found in practice to afford maximum holding qualities for the clip, while at the same time being as conservative as practicable in the amount of metal used. For example, where the clip is to be employed in an average railway box car, a width of approximately one and one-half inches and an overall length of approximately three inches for the clip have been found suitable, with the board-engaging portion 13 about twice as long as the sill-engaging portion 14.

A central bolt hole 17 in the board-engaging portion 13 receives the depending threaded shank of a clip-fastening bolt 18 carried by the floor board 10. A nut 19 threaded onto the bolt 18 is adapted to bear against the board-engaging portion 13 of the clip to fasten it securely to the floor board 10 and thereby also effect tight, securing engagement of the sill-engaging portion 14 with the sill 11.

According to the present invention, the floor clip 12 is provided with means integral with the clip body and resiliently opposing the fastening nut 19 to place the bolted assembly under slack-takeup tension and thus avoid looseness that might develop due to shrinkage of the floor board 10, or due to wearing in of the bolt 18 during use of the associated railway car. For this purpose, the body of the clip 12 may be made from spring steel or even from a relatively resilient grade of mild steel, and is formed with one or more elongated, narrow resilient tensioning tongues 20, which are engageable by and resiliently opposed to the thrust face of the nut 19. By having two of the tongues 20, each of them may be formed quite narrow, for example about $\tfrac{5}{32}$ to $\tfrac{3}{16}$ inch wide and of the full thickness of the body metal, but with their substantial combined tension concentrated in opposition to a large proportion of the relatively small area of the opposing thrust face of the nut 19.

The tensioning tongues 20 are cut directly from the board-engaging portion 13 of the clip body as by a punch and die severing process, and are in the form of longitudinally extending, parallel levers lying as close as practicable to the bolt hole 17, and adapted to bear with equal pressure against the respective opposed thrust face areas of the nut at opposite sides of the bolt hole. Undue flexure stress is avoided by making the tensioning tongues 20 as long as practicable, and for this purpose they preferably extend from the offsetting bend 15, at or adjacent to which they are attached, to slightly beyond the opposite or farthest edge of the nut 19. Tensioning leverage is attained by having the tongues bent diagonally down from adjacent their bases out of the lower face plane of the board-engaging portion 13 at such an angle as to project therebeyond initially about tongue-thickness at their free ends.

By preference, the lines of severance in the formation of the tongues 20 do not anywhere cut through the edges of the clip body, but are spaced well inwardly therefrom to afford a strong solid frame of metal all around the tongue and bolt apertures. Although closely approaching the bolt hole 17, the inner lines of tongue severance are preferably spaced therefrom by solid areas as narrow as permitted by sound shop practice. There are solid areas 21 and 22 of substantial size at the opposite sides of the bolt hole longitudinally of the clip, between the tensioning tongues 20, serving to receive, together with the tensioning tongues 20, the main securing thrust of the bolt 19. The thrust-receiving areas 21 and 22 are, of course, considerably wider than the tensioning tongues 20, and are solidly integral with the surrounding unbroken portions of the clip body. Thus, the thrust areas 21 and 22 may, in one sense, be considered opposing co-planar tongues intervening between the tensioning tongues 20 and solidly united by the surrounding frame formed by the integral margins of the board-engaging portions 13 and the offsetting bend 15 of the clip. Since all parts of the board-engaging portion 13 are thus integral with the solid off-setting bend 15, by which they are joined to the sill-engaging portion 14 of the clip, practically, if not every bit as strong securement is achieved by the clip 12 as if the board-engaging portion 13 were solid without the tensioning tongues 20 severed therefrom.

Inasmuch as the tensioning tongues 20 are located close to the bolt aperture 17, practically their entire subjacent areas are slidably engageable with the thrust face of the nut 19 in any rotative position of the nut when the latter is driven thereagainst. As a result, the nut may be screwed into place or backed off and unscrewed freely without any interference from the tensioning tongues. At the same time full tensioning effect of the tongues against the nut is had in any relative rotative position assumed by the tightened nut.

In addition to their tensioning function, the tongues 20 also serve as nut locking means to hold the nut against unintentionally turning loose. Thus, as seen in Fig. 1, one result of the long resilient leverage of the locking tongues 20 is to cause the free end portions of the tongues to bear against the adjacent edge of the nut 19, especially when the nut is loose to any extent so that the tongues 20 are allowed to spring to a corresponding extent below the lower plane of the board-engaging portion 13. This edge engagement, together with the frictional resistance developed by the opposing faces of the tongues 20 against the thrust face of the nut 19, tends to hold the nut against unintentional loosening rotation.

A more positive nut lock may be effected by forming either or both of the tensioning tongues 20 with a transverse nut-locking hump 23 of generally arcuate contour projecting outwardly from the associated tongue and adapted to engage within a complementary groove 24 formed in the thrust face of the nut 19. By having the hump 23 long, gently arcuate and only slightly protruding, and the groove 24 correspondingly shallow and formed on a large radius, resistance to intentional turning the nut 19 is minimized, and in the final tightening turns of the nut, the hump 23 will yield sufficiently due to the resilience of the metal for passage thereover of the ungrooved portions of the thrust face of the nut, springing back into the locking groove 24 on registration therewith. In practice both the hump 23 and the groove 24 may be considerably less prominent than idealistically illustrated, whereby the metal of the tongues 20 at the hump need spring only a very slight amount when the ungrooved portions of the nut face cam thereover in driving the nut tight against the thrust receiving areas 21 and 22 of the clip or in loosening the nut therefrom. Should the tightened nut come to rest with an ungrooved area of the thrust face bearing against the locking hump 23, then the increased friction of the hump against the engaged portion of the thrust face will strongly resist unintentional loosening rotation of the nut. Should the nut, nevertheless, turn in the loosening direction, the hump 23 will spring into the locking groove 24 when they come into registration. As a result of this arrangement, the nut 19 is quite positively locked against any appreciable unintentional loosening rotation from the tightened condition.

Turning of the clip 12 relative to the bolt 18, either due to friction in driving the nut 19 home, or subsequently due to stresses and strains in use of the assembly, may be effectively prevented by providing the clip with integral prongs 25. These may be pressed directly from the end marginal area of the board-engaging portion 13 of the clip adjacent to each corner equidistant from the bolt aperture 17 to project beyond the upper face of the clip so as to be given into the lower face of the floor board 10 when the clip is secured in place.

A simplified arrangement is shown in connection with a modified floor clip 27 in Figs. 5, 6 and 7. This clip is especially economical of the material, such as spring steel or resilient sheet steel, used in its manufacture. The clip 27 has an elongated body, including a board-engaging portion 28 and an offset sill-engaging flange portion 29, which is in part derived from the board-engaging portion of a related clip. Thus, the end of the sill-engaging portion 29 is formed on a radius which may be substantially semi-circular so that in cutting the clip from a sheet metal strip, indicated by the broken outline 30 (Fig. 7), it leaves a complementary cove recess in the end of the board-engaging portion of the next clip in the strip. The cove recess left by cutting of the sill-engaging portion of the related clip at the board-engaging portion 28 is indicated at 31 and leaves it with a generally fish-tail end shape. Relatively sharp corners 32 are thus formed, which are adapted to be turned up to provide a pair of spurs or prongs to be forced into the face of the secured floor board for holding the clip against turning relative to the securing bolt 18.

Through this arrangement neither of the engagement portions of the clip 27 is seriously diminished in effective area as compared with a rectangular clip, such as 12 (Fig. 1), but the advantages of saving in material are attained, while also providing for the prongs 32.

An integral resilient slack-takeup and nut locking tongue 33 to engage against the thrust face of the fastening-bolt nut 19a, is formed on the clip 27 by severing the board-engaging portion 28 on a longitudinally extending line 34 and a perpendicularly intersecting line 35 which extends from the severance line 34 into adjacent endwise spaced relation to one side of the clip. In the present instance, the line of severance 34 extends on the longitudinal center line of the clip, radially of a bolt aperture 36 and completely severs the narrow neck of material between the bolt aperture and the center point of the cove 30. The line of severance 35 extends on a tangent to the bolt aperture 36 in the direction opposite to the direction of tightening rotation of the nut of the fastening bolt. Thus, the base of the tongue where it integrally joins the body of the clip is of substantial width and merges with the plane of the board-engaging portion 28, and the outer side edge of the tongue comprises the adjacent portion of the cove edge. The tongue 33 is rendered tensionable by the nut by being bent diagonally out of the plane of the board-engaging portion 28 to a limited extent for resilient engagement at its lower face and lower free edge by the thrust face of the nut. Since the slant of the tongue 33 is in the direction of tightening rotation of the fastening nut, the latter will cam slidably over the tongue which yields under the thrust of the nut during tightening until flattened out when the thrust face of the nut is seated flush against the tongue and the remaining clip area about the bolt hole 36.

Resistance to unintentional loosening rotation of the nut is afforded by the tongue 33 both by frictional engagement with the thrust face of the nut and by engagement within any one of the preferably right angularly intersecting shallow nut-locking notches or grooves 24a with which the thrust face may be provided. Although the tensioning tongue 33 thus effectively resists unintentional loosening of the nut, the latter may conveniently be backed off with a wrench due to the simple frictional slidable opposition of the tongue to the thrust face of the nut and the smoothly arcuate, shoulderless form of the locking grooves 24a.

Another modification of our floor clip, identified generally by the numeral 37 in Figs. 8 to 11 has an elongated rectangular body including offset board-engaging and sill-engaging portions 38 and 38a, respectively. The clip 37 is formed with a somewhat different style of resilient slack-takeup and nut-locking tongue 39. One side of the tongue 39 is formed by a part of the circumference of a bolt hole 40 formed centrally in the board-engaging portion 38 of the clip. The end edge of the tongue 39 is formed by a line of severence 41 substantially tangential to the bolt hole 40 longitudinally of the clip in that area of the board-engaging portion 38 which is between the board-engaging portion 38 and the bolt hole. The adjacent end of the line of severance 41 joins a transverse perpendicular line of severance 42 parallel to and spaced inwardly from the end edge of the clip, but preferably spaced from the bolt hole 40 about twice the distance of overlap of a nut 43 of a fastening bolt 44. The outer end of the severance line 42 is preferably spaced from the adjacent edge of the clip substantially on that radius of the bolt hole 40 which extends through the nearest corner of the clip. Thus, the tongue 39 is formed entirely within the edges of the clip and without cutting through such edges.

Figure 9:
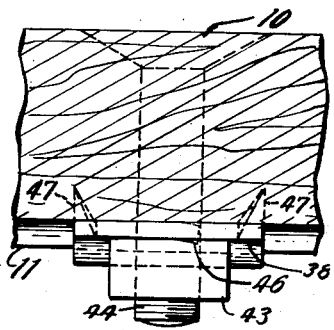
Fig. 9 is a transverse vertical sectional view through the floor, showing an end elevation of the clip of Fig. 8.
Figure 10:
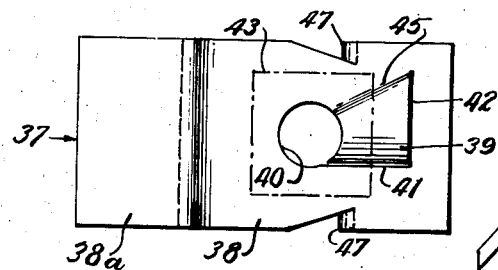
Fig. 10 is a bottom plan view of the clip of Fig. 8.
Figure 11:
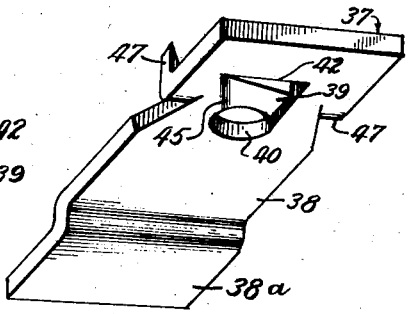
Fig. 11 is a bottom perspective view of the same clip.

Resilient projection of the takeup and locking tongue 39 from the nut-opposing face of the clip portion 38 into camming opposition to the thrust face of the nut 43 is effected by bending of the tongue 39 down in the course of fabrication along a diagonal permanent bend line 45 across its base extending from the outer end of the line of severance 42 to the bolt hole 40, as shown in Figs. 10 and 11. This angularity of the bend line 45 causes the free edge of the tongue 39 to extend down on a tilting angle from the bolt hole to the corner of the tongue. Since the tongue 39 is substantially wider than the adjacent side of the nut, the free edge of the tongue, because of its tilting angle, will tend first to engage the edge of the nut and thus firmly resist loosening rotation of the nut while permitting free camming thereover of the nut during tightening rotation. The liberal width of the base 45 of the tongue assures a strong resilient tensioning force applied against the nut by the tongue 39.

Where the material from which the clip 37 is made is of a relatively hard material, the edge of the resilient locking tongue 39 may have a tendency to bite into the edge of the nut 43, as indicated at 46 in Fig. 9, when an attempt is made to back the nut off for loosening it. However, since a substantial portion of the outer side of the tongue 39 projects beyond the edge of the nut 43, as seen in Figs. 8 and 10, pressure can be applied to the exposed portion of the tongue at the time the nut is turned loose to hold the tongue out of locking relation to the nut. In tightening the nut, however, it will cam freely over the surface of the tensioning and locking tongue 39 as the latter is gradually placed under increasing tension.

Means to hold the clip 37 against turning relative to the bolt 44 may comprise a pair of similar spurs or prongs 47 formed at directly opposite sides of the board-engaging portion 38, in general alinement with the bolt hole 40, by the partial severance from such edges and bending up toward the board-engaging side of the portion 38 of pointed triangular sections of the metal. These prongs 47 penetrate the floor boards 10 in response to driving force such as applied when the clip is fastened in place by tightening up the nut 43.

From the foregoing it will be apparent that the present invention affords a number of important advantages in the provision of a novel floor clip formed all in one piece and which, instead of requiring the assembly therewith of separate means for effecting shrinkage or wear takeup tension, is formed with integral means having such function and in addition serving as the nut locking structure of the clip unit. All of this is adapted to be accomplished with the use of plain sheet metal stock and by relatively inexpensive high speed metal working processes using but a minimum of material. This contrasts markedly with prior floor clips which used separate lock washers, or were provided with nut locking means without any attempt at making provision for taking up shrinkage or wear slack occurring after installation of the clip.

While the invention is susceptible of various modifications, and alternative constructions, we have shown in the drawings, and have herein described in detail certain preferred embodiments, but it is to be understood that we do not thereby intend to limit the invention to the specific forms disclosed, but intend to cover all modifications and alternative constructions falling within the spirit and scope of the invention as expressed in the following claims.

We claim:

1. A floor clip comprising a body of resilient metal having a bolt aperture therethrough, a portion of the body spaced substantially from the bolt aperture being offset relative to the apertured portion of the body and being joined therewith by an integral offsetting bend, and a tensioning tongue severed from the body of the clip adjacent to the bolt aperture in the form of an elongated resilient lever having its base integral with the clip adjacent to said offsetting bend and adapted to bear resiliently against the thrust face of the nut of a fastening bolt driven toward the clip body, said resilient tongue being adapted to extend entirely across the thrust face of the nut with the free end of the tongue extending beyond and engaging with the contiguous edge of the nut to resist unintentional loosening rotation of the nut.

2. A floor clip comprising relatively offset board-engaging and sill-engaging portions, a bolt hole in the sill-engaging portion at a substantial distance from the offset, and an elongated resilient tensioning tongue in the form of a partially severed press-out from the board-engaging portion, said tongue joining the board-engaging portion immediately adjacent to the offset and projecting away from the offset and past the bolt hole slightly to one side of the latter, said tongue being of such length that it will extend entirely across the thrust face of a nut threaded upon a bolt occupying said bolt hole, and will have its free end engaging a nut edge bounding such thrust face.

3. A floor clip comprising relatively offset board-engaging and sill-engaging portions, a bolt hole in the sill-engaging portion at a substantial distance from the offset, an elongated resilient tensioning tongue in the form of a partially severed press-out from the board-engaging portion, said tongue joining the board-engaging portion immediately adjacent to the offset and projecting away from the offset and past the bolt hole slightly to one side of the latter, said tongue being of such length that it will extend entirely across the thrust face of a nut threaded upon a bolt occupying said bolt hole, and a curved hump formed on said tongue, intermediate its ends, adapted to engage a shallow groove formed in the thrust face of such a nut.

4. A floor clip comprising relatively offset board-engaging and sill-engaging portions, a bolt hole in the sill-engaging portion at a substantial distance from the offset, an elongated resilient tensioning tongue in the form of a partially severed press-out from the board-engaging portion, said tongue joining the board-engaging portion immediately adjacent to the offset and projecting away from the offset and past the bolt hole slightly to one side of the latter, said tongue being of such length that it will extend entirely across the thrust face of a nut threaded upon a bolt occupying said bolt hole, and a curved hump formed on said tongue, intermediate its ends, adapted to engage a shallow groove formed in the thrust face of such a nut, said tongue being adapted to extend beyond a thrust face bounding edge of such a nut and forcibly to engage such edge.

5. A floor clip comprising relatively offset board-engaging and sill-engaging portions, a bolt hole in the board-engaging portion at a substantial distance from the offset, and a pair of spaced apart elongated resilient tensioning tongues each in the form of a partially severed press-out from the board-engaging portion, said tongues joining the board-engaging portion immediately adjacent to the offset and projecting in parallelism away from the offset past the bolt hole on opposite sides of the latter, said tongues being of such length that they will extend entirely across the thrust face of a nut threaded upon a bolt occupying said bolt hole and will have their free ends engaging a thrust face bounding edge of such a nut.

6. A floor clip comprising relatively offset board-engaging and sill-engaging portions, a bolt hole in the board-engaging portion at a substantial distance from the offset, and a pair of spaced apart elongated resilient tensioning tongues each in the form of a partially severed press-out from the board-engaging portion, said tongues joining the board-engaging portion immediately adjacent to the offset and projecting in parallelism away from the offset past the bolt hole on opposite sides of the latter, said tongues being provided intermediate their ends with curved humps each adapted to engage in a shallow groove formed in the thrust face of a nut threaded upon a bolt occupying such bolt hole.

JOHN A. MacLEAN, Jr.
NORRIS F. McNAUGHT.
ERNEST G. DOKE.